(12) United States Patent
Paul et al.

(10) Patent No.: US 10,190,674 B2
(45) Date of Patent: Jan. 29, 2019

(54) DRIVE APPARATUS

(71) Applicant: Dr. Ing. h.c. F. Porsche Aktiengesellschaft, Stuttgart (DE)

(72) Inventors: Joachim Paul, Benningen a.N. (DE); Johannes Toepfl, Feldkirch (AT)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/785,450

(22) Filed: Oct. 17, 2017

(65) Prior Publication Data

US 2018/0112768 A1 Apr. 26, 2018

(30) Foreign Application Priority Data

Oct. 25, 2016 (DE) .................. 10 2016 120 356

(51) Int. Cl.

| | |
|---|---|
| *F16H 55/18* | (2006.01) |
| *F16H 57/12* | (2006.01) |
| *F16H 1/16* | (2006.01) |
| *F16H 1/20* | (2006.01) |
| *H02K 7/08* | (2006.01) |
| *H02K 7/116* | (2006.01) |
| *F16H 57/02* | (2012.01) |

(52) U.S. Cl.
CPC .............. *F16H 57/12* (2013.01); *F16H 1/16* (2013.01); *F16H 1/203* (2013.01); *H02K 7/081* (2013.01); *H02K 7/1166* (2013.01); *F16H 2057/02034* (2013.01); *F16H 2057/127* (2013.01)

(58) Field of Classification Search
CPC .................. H02K 7/081; H02K 7/1166; F16H 2057/02034; F16H 57/12
See application file for complete search history.

(56) References Cited

U.S. PATENT DOCUMENTS

| | | | |
|---|---|---|---|
| 5,184,039 A | 2/1993 | Kraft | |
| 2002/0163269 A1 | 11/2002 | Steuer et al. | |
| 2009/0266640 A1* | 10/2009 | Oshima | B62D 5/04 180/444 |
| 2010/0116582 A1* | 5/2010 | Rho | B62D 5/0409 180/444 |
| 2010/0206111 A1 | 8/2010 | Keller et al. | |

(Continued)

FOREIGN PATENT DOCUMENTS

| | | |
|---|---|---|
| DE | 10121769 A1 | 12/2002 |
| DE | 102007038916 A1 | 2/2009 |

*Primary Examiner* — Jake Cook
(74) *Attorney, Agent, or Firm* — Leydig, Voit & Mayer, Ltd.

(57) ABSTRACT

A drive apparatus includes a housing, an electric motor arranged in the housing, and a worm gear mechanism arranged in the housing. The worm gear mechanism includes a worm gear arranged on a rotor shaft of the electric motor and a gearwheel in engagement with the worm gear and fixedly connected to an output shaft so as to rotate with the output shaft. The electric motor is axially mounted in the housing with one axial end via a stop element and with the opposite axial end via an axial clamping element. The axial clamping element has a spring element, a separate floating holding element, and a separate elastomer element. The holding element is arranged axially between the spring element and the elastomer element.

9 Claims, 2 Drawing Sheets

(56) References Cited

U.S. PATENT DOCUMENTS

| | | | |
|---|---|---|---|
| 2011/0000737 A1* | 1/2011 | Nagase | B62D 5/0406 180/444 |
| 2011/0240399 A1* | 10/2011 | Suzuki | B62D 5/0409 180/444 |
| 2015/0040707 A1* | 2/2015 | Hong | H02K 7/081 74/425 |

* cited by examiner

DRIVE APPARATUS

CROSS REFERENCE TO RELATED APPLICATIONS

This application claims benefit to German Patent Application No. DE 10 2016 120 356.4, filed Oct. 25, 2016, which is hereby incorporated by reference herein.

FIELD

The invention relates to an electric drive apparatus having an electric motor and a worm gear mechanism.

BACKGROUND

Worm gear mechanisms belong to the standard gear mechanisms and are usually used as step-down gear mechanisms, high step-down ratios being possible by way of the worm gear mechanism. For example, relatively rapidly rotating electric motors can be used for slow adjustment movements by way of the high step-down ratio which can be realized by way of the worm gear mechanism, a high torque being provided for the adjustment movements. Worm gear mechanisms of this type are used in automotive applications, for example, in electric power steering systems, in window lifter drives or in sunroof drives.

The worm gear mechanisms usually have a worm gear and a gearwheel which engages into the worm gear, the worm gear being driven by an electric motor via a drive shaft, and the gearwheel being connected fixedly to an output shaft so as to rotate with it. The worm gear mechanism can be configured with a second step-down stage for a higher step-down ratio.

For a long service life of the worm gear mechanism, the backlash between the worm gear and the gearwheel which engages into the worm gear should be set in an optimum manner. If the backlash is set to be too great or too small, this results in increased wear which reduces the service life of the worm gear mechanism. In order to ensure the optimum backlash at any time, it is known from the prior art to prestress the worm gear axially. For example, DE 10 2007 038 916 A1 describes a belt tensioner drive for a safety belt, the belt tensioner drive having an electric motor and a double worm gear mechanism. The electric motor drives a worm gear via a rotor shaft, which worm gear engages into a gearwheel which is arranged on an intermediate shaft, the intermediate shaft additionally having a second worm gear which is operatively connected to a second gearwheel. The second gearwheel is connected fixedly to a gear mechanism output shaft so as to rotate with it. In order to set the correct backlash, the belt tensioner drive has an axially prestressed pot bearing, in which the rotor shaft is mounted. The prestress takes place by way of a spring element which is arranged between the axially displaceable pot bearing and the rigid housing. It is a disadvantage of said embodiment that the gear backlash is compensated for via the axially displaceable pot bearing which is prestressed via a spring element, the pot bearing absorbing axial and radial loads, and the sliding faces of the pot bearing and the housing which bear against one another being subject to wear in the case of an axial displacement of the pot bearing, as a result of which the service life of the worm gear mechanism is reduced.

SUMMARY

In an embodiment, the present invention provides a drive apparatus. The drive apparatus includes a housing, an electric motor arranged in the housing, and a worm gear mechanism arranged in the housing. The worm gear mechanism includes a worm gear arranged on a rotor shaft of the electric motor and a gearwheel in engagement with the worm gear and fixedly connected to an output shaft so as to rotate with the output shaft. The electric motor is axially mounted in the housing with one axial end via a stop element and with the opposite axial end via an axial clamping element. The axial clamping element has a spring element, a separate floating holding element, and a separate elastomer element. The holding element is arranged axially between the spring element and the elastomer element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
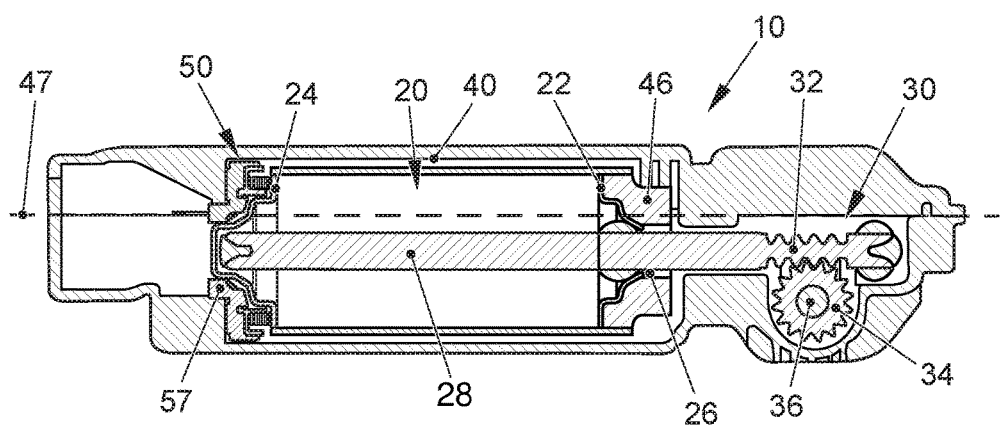
FIG. 1 shows a longitudinal section of a drive apparatus.

Embodiments of the invention provide drive apparatuses that allow backlash to be set in an improved manner at any time in a simple and low-wear way.

A drive apparatus according to an embodiment of the invention has an electric motor and a worm gear mechanism, a worm gear being arranged on a rotor shaft of the electric motor. Here, the worm gear can be configured in one piece with the rotor shaft or can be of separate configuration, and can be connected fixedly to the rotor shaft so as to rotate with it. The worm gear engages into a gearwheel which is connected fixedly to an output shaft or further gear stage, such as a further spiral toothed gear, so as to rotate with it, for example via a positively locking connection or a pressed connection.

The electric motor and the worm gear mechanism are arranged in a housing, the electric motor being mounted axially via a stop element and an axial clamping element. Here, the electric motor bears against the stop element with one axial end and against the axial clamping element with the opposite axial end. The rotor shaft is mounted axially and radially in the electric motor.

The axial clamping element has a spring element, a separate holding element and a separate elastomer element, the holding element being arranged axially between the spring element and the elastomer element. The spring element is arranged between the axial end of the electric motor and the holding element. The elastomer element is arranged between the holding element and the housing, with the result that the holding element is mounted in a floating manner. The arrangement of the holding element between the spring element and the elastomer element prevents the spring element from being able to penetrate into the relatively soft elastomer element.

As a result of the displaceable arrangement of the entire electric motor in the housing and the axial prestress of the electric motor by way of the axial clamping element, the backlash, the tolerance compensation, and the different thermal expansion or contraction in the case of cold can be set in a simple way, without wear occurring which reduces the service life. Moreover, impact loads and vibrations of the electric motor can be damped and absorbed in an improved manner by way of the elastomer element of the axial clamping element.

In one preferred refinement, the electric motor has in each case one motor end pot at its two axial ends. The stop element and the axial clamping element act on the motor end pots and mount them in each case directly. In this way, the electric motor is mounted simply and inexpensively in the housing.

The elastomer element is preferably injection molded onto the holding element, as a result of which the manufacturing complexity of the axial clamping element is reduced.

In one preferred refinement, the elastomer element reaches through the holding element and bears directly against the axial end of the electric motor above a defined spring travel of the spring element. In this way, the electric motor is prestressed axially by way of the spring element during normal operation, the electric motor bearing against the elastomer element with the axial end in the case of impact loading, and the elastomer element absorbing and damping the impact loading. Here, the damping takes place by way of the inner friction of the elastomer element.

The spring element is preferably an annular spring body, the spring body being a cup spring, cup springs which are connected one behind another, or a multiply corrugated spring body. A spring element of this type can absorb high axial loads with a small installation space. In addition, a spring element of this type has a flat spring characteristic curve on account of a constant prestress.

In one special refinement, the stop element is arranged at that axial end of the electric motor which faces the worm gear mechanism, and the axial clamping element is arranged at that axial end of the electric motor which faces away from the worm gear mechanism.

The holding element preferably has a spring travel limiter which comes directly into contact with the axial end of the electric motor above a defined spring travel of the spring element. The spring travel limiter can be, for example, an annular axial projection or annular web. Excessive compression of the spring element is prevented by way of the spring travel limiter.

The holding element preferably has an annular pocket, in which the spring element is arranged. As a result of the arrangement of the spring element in the annular pocket, the spring element is positioned and guided. The spring travel limiter forms the inner wall or the outer wall of the annular pocket.

The worm gear mechanism is preferably a double worm gear mechanism, a second worm gear being arranged fixedly on the output shaft so as to rotate with it, which second worm gear engages into a second gearwheel. The additional stage of the double worm gear mechanism makes a higher step-down ratio possible, as a result of which higher torques can be realized at the gear mechanism output shaft.

FIG. 1 shows an electric drive apparatus 10 having an electric motor 20 and a worm gear mechanism 30. The electric motor 20 and the worm gear mechanism 30 are arranged in a common housing 40, the housing 40 having an upper part 42 and a lower part 44 which bear against one another in a dividing plane 47.

The worm gear mechanism 30 comprises a worm gear 32 and a gearwheel 34 which engages into the worm gear 32.

The worm gear 32 is fixed at the free end of a rotor shaft 28 of the electric motor 20, the rotor shaft 28 being connected fixedly to the rotor of the electric motor 20 so as to rotate with it, and being mounted in the electric motor via bearings which are not shown in the figures. The gearwheel 34 is mounted on an output shaft 36 and is connected fixedly to the latter so as to rotate with it, for example via a positively locking or non-positive connection.

The electric motor 20 has in each case one motor end pot 22, 24 at its axial ends. The proximal motor end pot 22 is arranged at the axial end which faces the worm gear mechanism 30, and the distal motor end pot 24 is arranged at that axial end of the electric motor 20 which faces away from the worm gear mechanism 30, the proximal motor end pot 22 having a central opening 26, through which the rotor shaft 28 runs. A stop element 46 with torque protection in both rotational directions of the electric motor acts on the proximal motor end pot 22, and an axial clamping element 50 acts on the distal motor end pot 24, as a result of which the electric motor 20 is mounted axially in the housing 40.

Figure 2:
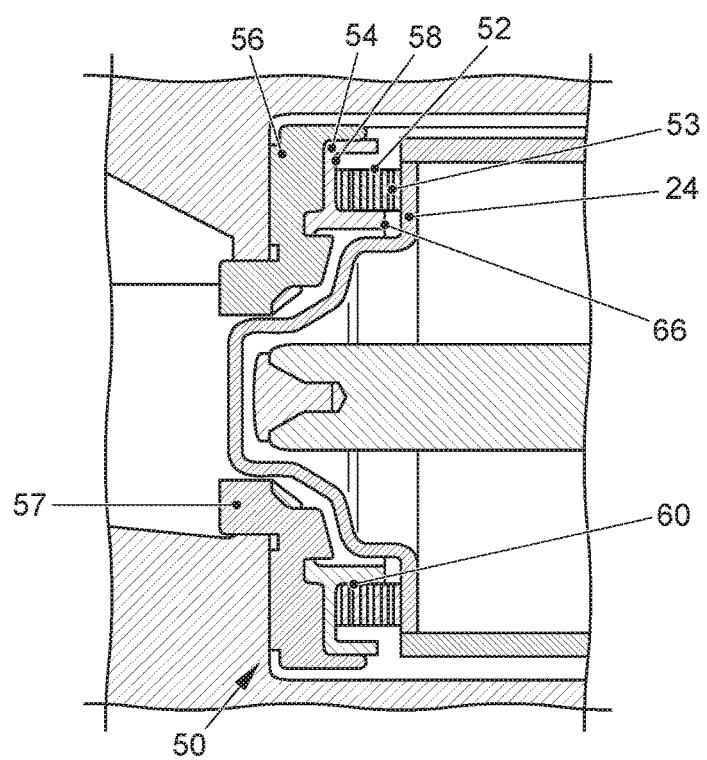
FIG. 2 shows a detail of the drive apparatus from FIG. 1 in a sectioned illustration.
Figure 3:
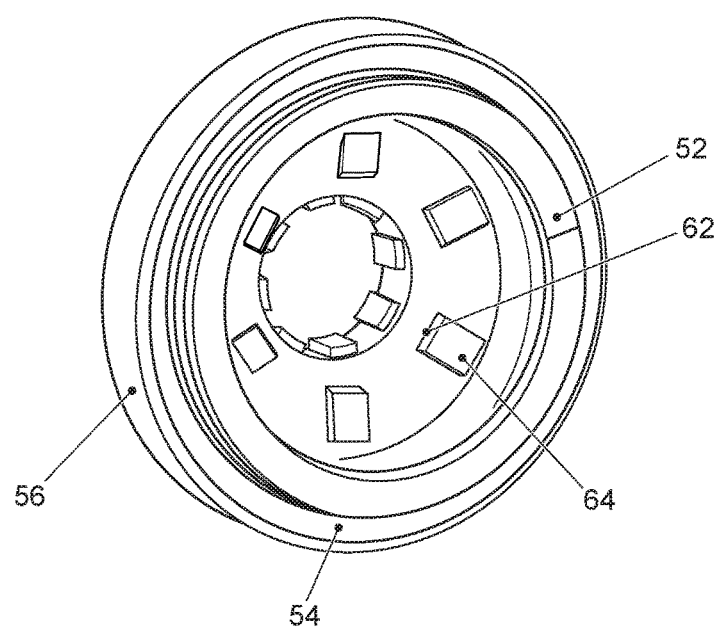
FIG. 3 shows a perspective illustration of an axial clamping element.

FIG. 2 shows the axial clamping element 50 according to an embodiment of the invention in a sectioned illustration, and FIG. 3 shows it in a perspective illustration. The axial clamping element 50 is composed of a spring element 52, a holding element 54 which is mounted in a floating manner, and an elastomer element 54. The spring element 52 is a multiply corrugated, annular spring body 53 which is arranged between the motor end pot 24 and the holding element 54. The annular spring body 53 is arranged in an annular pocket 58 which is configured in the holding element 56, the spring element 52 being positioned and guided by way of the inner wall 60 of the annular pocket 58. Here, the inner wall 60 of the annular pocket 58 is configured in such a way that it forms a spring travel limiter 66, with the result that the motor end pot 24 bears directly against the spring travel limiter 66 above a defined compression travel of the spring element 52 and the over-compression of the spring element 52 is prevented as a result. On the side which lies opposite the spring element 52, the elastomer element 56 is arranged on the holding element 54, which elastomer element 56 is injection molded onto the holding element 54. The holding element 54 has a plurality of openings 62, through which the elastomer element 56 reaches and forms projections 64 which protrude axially from the holding element 54. The elastomer element 54 is mounted in the housing 20 axially and, via a collar 57, radially, the elastomer element 56 mounting the entire axial clamping element 50 in the housing 20.

By way of the spring element 52 of the axial clamping element 50 according to an embodiment of the invention, production tolerances and temperature-induced tolerances of the electric motor 20 and of the housing 40 can be compensated for, and the backlash can be set, despite manufacturing and temperature tolerances, in such a way that the wear on the worm gear and on the gearwheel is low. Moreover, in the case of overloading or blocking of the output shaft 36, the axial loading can be damped by way of the elastomer element 56, a plurality of projections 64 of the elastomer element 56 being directly in contact with the motor end pot 24 above a defined compression travel of the spring element 52, and the elastomer element 56 being deformed. Axial movement is damped by way of the inner friction of the elastomer element 56, which inner friction results from the deformation of the elastomer element 56. In addition, acoustic decoupling of the electric motor 20 from the housing 20 takes place, by the electric motor 20 being mounted on the housing 20 via the axial clamping element 50, and the vibrations which emanate from the electric motor 20 being transmitted to the housing 40 in a greatly attenuated manner.

Other structural embodiments than the embodiments which are described are also possible, which structural embodiments fall within the scope of protection of the main claim. For example, the worm gear 30, the axial clamping element 50 or the housing 40 can be of different configuration.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A drive apparatus, comprising:
    a housing;
    an electric motor arranged in the housing; and
    a worm gear mechanism arranged in the housing, wherein the worm gear mechanism includes a worm gear arranged on a rotor shaft of the electric motor and a gearwheel in engagement with the worm gear and fixedly connected to an output shaft so as to rotate with the output shaft,
    wherein the electric motor is axially mounted in the housing with one axial end via a stop element and with the opposite axial end via an axial clamping element,
    wherein the axial clamping element has a spring element, a separate floating holding element, and a separate elastomer element,
    wherein the holding element is arranged axially between the spring element and the elastomer element.

2. The drive apparatus as claimed in claim 1, wherein the electric motor has in each case one motor end pot at its axial ends, wherein each of the axial clamping element and the stop element mount a respective motor end pot directly.

3. The drive apparatus as claimed in claim 1, wherein the elastomer element is injection molded onto the holding element.

4. The drive apparatus as claimed in claim 1, wherein the elastomer element reaches through the holding element and bears directly against the axial end of the electric motor above a defined spring travel of the spring element.

5. The drive apparatus as claimed in claim 1, wherein the spring element is an annular spring body.

6. The drive apparatus as claimed in claim 1, wherein the stop element is arranged at that axial end of the electric motor which faces the worm gear mechanism, and wherein the axial clamping element is arranged at that axial end of the electric motor which faces away from the worm gear mechanism.

7. The drive apparatus as claimed in claim 1, wherein the holding element has a spring travel limiter which comes directly into contact with the axial end of the electric motor above a defined spring travel of the spring element.

8. The drive apparatus as claimed in claim 1, wherein the holding element has an annular pocket in which the spring element is arranged.

9. The drive apparatus as claimed in claim 1, wherein the worm gear mechanism is a double worm gear mechanism, wherein a second worm gear is arranged fixedly on the output shaft so as to rotate with it, and wherein the second worm gear engages into a second gearwheel.

* * * * *